United States Patent [19]

Gamo et al.

[11] 4,153,484
[45] May 8, 1979

[54] HYDROGEN STORAGE MATERIAL

[75] Inventors: Takaharu Gamo, Fujiidera; Yoshio Moriwaki, Moriguchi; Toshio Yamashita, Katano; Masataro Fukuda, Toyonaka, all of Japan

[73] Assignee: Matsushita Electric Industrial Co., Ltd., Japan

[21] Appl. No.: 760,421

[22] Filed: Jan. 18, 1977

[30] Foreign Application Priority Data

Jan. 20, 1976 [JP] Japan .................. 51-5635
Jan. 20, 1976 [JP] Japan .................. 51-5632
Apr. 14, 1976 [JP] Japan .................. 51-42841
Apr. 14, 1976 [JP] Japan .................. 51-42842

[51] Int. Cl.$^2$ .................................................. C22C 22/00
[52] U.S. Cl. .................................................. 148/32; 34/15; 75/134 C; 75/134 F; 75/134 M; 75/134 N; 75/161; 75/175.5; 75/176; 75/177; 423/644
[58] Field of Search ............ 75/134 M, 175.5, 177, 75/176, 161, 134 N, 134 C, 134 F; 148/32, 32.5; 34/15; 423/644

[56] References Cited

U.S. PATENT DOCUMENTS 2,926,981 3/1960 Stout et al. .................. 75/175.5
3,922,872 12/1975 Reilly et al. .................. 75/175.5

*Primary Examiner*—R. Dean
*Attorney, Agent, or Firm*—Wenderoth, Lind & Ponack

[57] ABSTRACT

An economical metallic material for storage of hydrogen constituted by an intermetallic compound which exists as a Laves phase, has a hexagonal crystal structure of the MgZn$_2$ type (C14 type), and in which the crystal lattice parameters a and c are in the ranges a=4.80~5.10 (Å) and c=7.88~8.28 (Å). The material of the invention permits absorption of large amounts of hydrogen and efficient desorption thereof under close to normal temperature and pressure conditions, and for reduced cost of material preferably includes as principal components manganese and at least titanium or zirconium.

18 Claims, 12 Drawing Figures range of alloy magnetic material having outstanding qualities

Pressure-Composition desorption isotherms for the $Ti_{0.5}Zr_{0.5}Mn_2$-H system at several temperatures (at. H/mol $Ti_{0.5}Zr_{0.5}Mn_2$)

Pressure-Composition isotherms for the $Ti_{0.8}Zr_{0.2}Mn_{1.7}Mo_{0.3}$-H system (at. H/mol. $Ti_{0.8}Zr_{0.2}Mn_{1.7}Mo_{0.3}$)

Pressure-Composition Isotherms for the
$Ti_{0.7} Zr_{0.3} Mn_{1.9} Mo_{0.1}$-H (at. H/mol, $Ti_{0.7}Zr_{0.3}Mn_{1.9}Mo_{0.1}$)

Pressure-Composition desorption Isotherms for the $Ti_{0.6}Zr_{0.4}Mn_{1.9}Cu_{0.1}$-H system (at. H/mot. $Ti_{0.6}Zr_{0.4}Mn_{1.9}Cu_{0.1}$)

HYDROGEN STORAGE MATERIAL

The present invention relates to material for storage, preservation and transport of hydrogen.

It is known that in certain conditions of temperature and pressure of gaseous vapour, metals such as the transition elements of Groups III ~ V of the periodic table may keep, absorb or combine chemically with hydrogen in high density to form metal hydrides, for example, $LaH_3$, $CeH_3$, $TiH_2$, $ZrH_2$, VH, and NbH, in which there is a maximum of three hydrogen atoms to one atom of the metal, and that when temperature and pressure conditions are subsequently changed in a specific manner absorbed hydrogen is released from these hydrides. Thus, hydrogen may be stored under safer conditions and may be transported more easily than is possible using conventional hydrogen cylinders, and may be made available as a gas when required. However, in comparison with a conventional hydrogen storage method in pressure vessels use of these substances has the disadvantage that comparatively extreme ambient conditions must be achieved in order to effect absorption and desorption of hydrogen thereby, since the substances form comparatively strong bonds with hydrogen. For example, if titanium is employed, when the pressure is in the vicinity of normal pressure, the metal must be heated to approximately 400° C. to permit effective absorption of hydrogen to proceed and must be heated to approximately 600° C. to cause subsequent desorption of hydrogen. The requirement for such high temperatures is of course disadvantageous from the viewpoint of fuel costs and also from the viewpoint of necessary equipment, particularly at distribution terminals where the hydrogen is employed. To overcome this disadvantage, a variety of other metallic materials for storing hydrogen have been proposed, typical examples being titanium or zirconium alloys such as FeTi, Ti (or Zr) — Cu alloys, Ti (or Zr) — Ni alloys and Ti (or Zr) — Co alloys, magnesium alloys such as $Mg_2Cu$ and $Mg_2Ni$, and rare earth compounds such as $LaNi_5$.

Of these materials, the magnesium alloys for example, permit storage of a comparatively large amount of hydrogen per unit weight of storage material. However, when magnesium alloys are employed, considerable energy must be supplied to effect desorption of stored hydrogen, since the dissociation pressure at room temperature is very low, and desorption of hydrogen can be effected only under conditions of high temperature exceeding 250° C., and even under these conditions it takes a long time and needs a large amount of energy. In contrast to this, the dissociation pressure of hydrogen stored in rare earth compounds is several atmospheres at room temperature, and both absorption and desorption of hydrogen can therefore be effected efficiently and comparatively rapidly at room temperature. On the other hand, the amount of storable hydrogen per unit weight of storage material is slightly less than that for other types of storage material, in addition to which there is of course the disadvantage from the viewpoint of large-scale use that rare earth materials are extremely expensive. Of the titanium alloys, the material which has been considered to be most promising is ferrotitanium, FeTi alloy, which has the advantages that it is comparatively cheap, that the dissociation pressure of hydrogen combined therewith is several atmospheres at room temperature, and that qualities of the material remain substantially unchanged after repeated absorption and desorption of hydrogen thereby. However, FeTi alloy also has disadvantages, in that a high temperature of over about 350° C. and high pressure of over about 30 atmospheres are necessary for initial hydriding thereof, that the rates of absorption and desorption of hydrogen thereby are comparatively slow, and that there is a certain amount of hysteris effect in the hydrogen absorption and desorption cycle effected therein, i.e., it is difficult to effect discharge of the complete amount of hydrogen absorbed by the material.

It is accordingly a principal object of the invention to provide improved hydrogen storage material in which the dissociation pressure of combined hydrogen is several atmospheres at room temperature, which is able to absorb and desorb hydrogen at high rates in normal temperature conditions, and which is of comparatively low cost, whereby said material is of great practical application.

It is a further object of the invention to provide hydrogen storage material which is suitable for employment by being enclosed in a pressure container for storage, preservation and transport of hydrogen gas.

According to the present invention, there is provided metallic material for storage of hydrogen which includes a substance able to store hydrogen and defining an alloy phase which is substantially a Laves phase constituted by an intermetallic compound, which has a hexagonal crystal structure of the $MgZn_2$ type (C14), and the crystal lattice parameters a and c of which have values in the ranges;

$$a = 4.80 \sim 5.10 \,(\text{Å}),$$

$$c = 7.88 \sim 8.28 \,(\text{Å}).$$

In a preferred embodiments of the present invention, said substance of metallic material able to store hydrogen is constituted substantially by an alloy phase including titanium and manganese, is constituted substantially by an alloy phase including zirconium and manganese, is constituted substantially by an alloy phase including titanium, zirconium, and manganese, or is constituted substantially by a Ti — Zr — Mn alloy, Ti — Zr — Mn — Mo alloy or Ti — Zr — Mn — Cu alloy.

The many advantages achieved by use of the material of the invention may be appreciated from the following detailed description of several preferred embodiments thereof when read in reference to the attached drawings, in which FIG. 1 is a graph showing the relationship between the parameters a and c of unit cells in the crystal lattice of various hydrogen storage materials according to the invention, the preferred range of values of these parameters being indicated by the shaded portion of the drawing;

Figure 11:
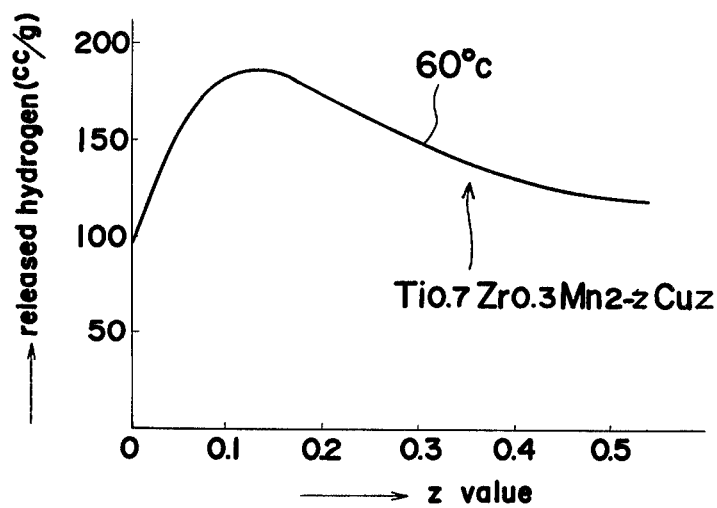
Figure 12:
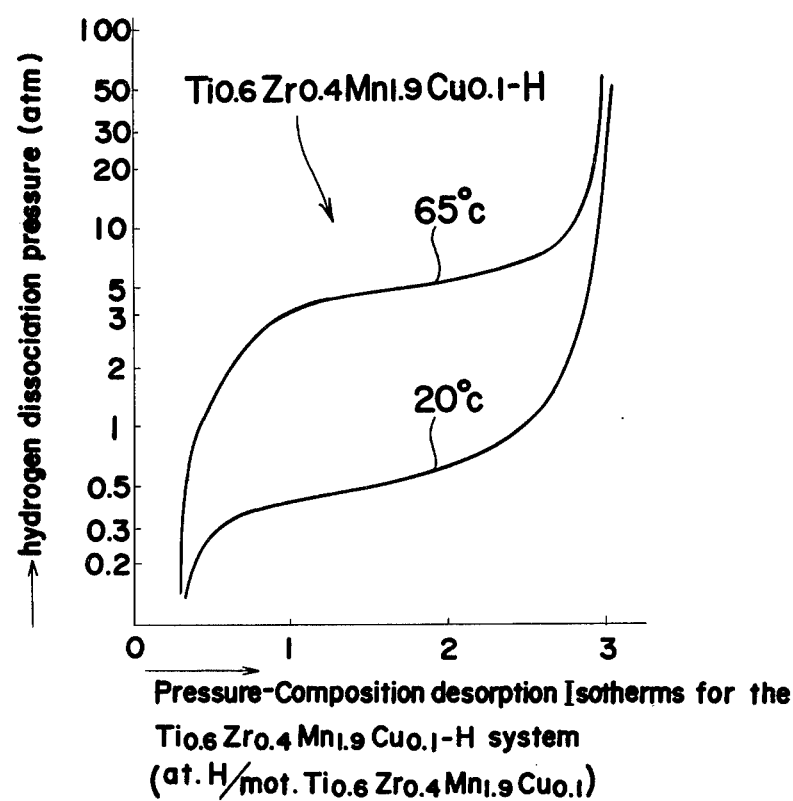

FIG. 11 is a similar drawing showing the relation of the amount of released hydrogen (cc/g) at 60° C. to the value of z in an alloy having the general formula Ti$_{0.7}$Zr$_{0.3}$Mn$_{2-z}$Cu$_z$; and FIG. 12 is a graph which plots equilibrium pressure — composition isotherms for the system Ti$_{0.6}$Zr$_{0.4}$Mn$_{1.9}$Cu$_{0.1}$ — H in illustration of the hydriding characteristics of a Ti — Zr — Mn — Cu alloy according to the invention.

The metallic material for storage of hydrogen according to the present invention is an intermetallic compound which exists effectively as a Laves phase, which has a hexagonal crystal structure of the MgZn$_2$ type (C14 type), and in which the values of the parameters a and c of a unit cell thereof are in the following ranges:

$$a = 4.80 \sim 5.10 \text{ (Å)}$$
$$c = 7.88 \sim 8.28 \text{ (Å)}.$$

The metallic material for storage of hydrogen according to the invention forms a hydride in a short time at room temperature, i.e., in the vicinity of 20° C., absorbs and effects stable retention of a large amount of hydrogen in solid solution, and can be caused to release the hydrogen held thereby, even at room temperature, by lowering of ambient pressure to values lower than the characteristic values of dissociation pressure of hydrogen with respect to the various component substances constituting the material of the invention.

Analysis of the material of the invention by X-ray and similar techniques showed that with respect to composition the material is effectively an intermetallic compound existing in the Laves phase, and that its crystal structure is the MgZn$_2$ type (C14 type) belonging to the hexagonal system or of the MgCu$_2$ type (C15 type) belonging to the cubic system. Tests showed that material of having a crystal structure of the MgZn$_2$ type has particular advantages with respect to storage of hydrogen.

Typical examples of possible values of the crystal lattice parameters a and c of a compound having an MgZn$_2$ type (C14) crystal structure and existing as a Laves phase are shown in Table 1, which lists values given by Dr. Max Hansen in 'Constitution of Binary Alloys' (1958).

Table 1

| Compound | a$_0$ (Å) | c$_0$ (Å) |
|---|---|---|
| MgZn$_2$ | 5.22 | 8.557 |
| BaMg$_2$ | 6.649 | 10.676 |
| CaCd$_2$ | 5.993 | 9.654 |
| CaLi$_2$ | 6.26 | 10.25 |
| CaMg$_2$ | 6.23 | 10.12 |
| CrBe$_2$ | 4.27 | 6.92 |
| FeBe$_2$ | 4.212 | 6.853 |
| KNa$_2$ | 7.50 | 12.30 |
| MnBe$_2$ | 4.240 | 6.924 |
| NbFe$_2$ | 4.830 | 7.882 |
| NbMn$_2$ | 4.879 | 7.902 |
| ReBe$_2$ | 4.354 | 7.101 |
| SrMg$_2$ | 6.439 | 10.494 |
| TaFe$_2$ | 4.827 | 7.838 |
| TaMn$_2$ | 4.87 | 7.95 |
| TiFe$_2$ | 4.779 | 7.761 |
| TiMn$_2$ | 4.825 | 7.917 |
| TiCr$_2$ | 4.932 | 7.961 |
| UNi$_2$ | 4.966 | 8.252 |
| VBe$_2$ | 4.394 | 7.144 |
| WBe$_2$ | 4.446 | 7.289 |
| WFe$_2$ | 4.727 | 7.704 |
| ZrCr$_2$ | 5.102 | 8.238 |
| ZrMn$_2$ | 5.019 | 8.249 |
| ZrRe$_2$ | 5.262 | 8.593 |
| ZrRu$_2$ | 5.141 | 8.507 |
| ZrOs$_2$ | 5.189 | 8.526 |
| ZrV$_2$ | 5.288 | 8.664 |

An alloy having excellent properties as a hydrogen storage material is constituted by those binary alloys of Table 1, or by those ternary or quaternary alloys constituted by suitable combinations of the alloys of Table 1, whose alloy phase is substantially uniform, which crystallize well, whose crystal structure is of the MgZn$_2$ type existing in the Laves phase, and in which the a and c parameters of the crystal lattice are in the ranges; a = 4.80 ~ 5.10 (Å) and c = 7.88 ~ 8.28 (Å). If these conditions are met, a hydrogen storage material of similar high quality is obtained according to the invention by employing one or more of the alloys of Table 1 as a base material and forming an alloy by partial substitution of the base material with third, fourth, fifth, or further elements.

A study of the relation between the lattice parameters and hydrogen dissociation equilibrium pressure showed that dissociation pressure tends to increase as the lattice parameters become smaller. Considering the relation between this change of hydrogen dissociation pressure and the heat of formation of hydrides of Ti-Mn alloys it is found that whereas the heat of dissociation of hydrogen has a comparatively high negative value for titanium, which is in Group IVa of the periodic table, for manganese, which is in Group VIa, and for other elements of Groups VIa ~ VIII other than palladium, Pd, the heat of formation of the hydride is positive, and that for palladium the heat of formation has a comparatively small negative value. In other words, the heat of formation of hydride in a Ti-Mn alloy can be made correspondingly small by increasing the proportion of the Mn component, and it is inferrable from this that reduction of hydrogen dissociation pressure may be achieved by increasing the proportion of the Ti component in a Ti-Mn alloy, since this increase is accompanied by an increase in the heat of formation of a hydride of the alloy and production of a more stable hydride.

Examples of alloys produced on the basis of these considerations, the values of the lattice parameters a and c of these alloys, and the amount of hydrogen absorbed thereby at room temperature, i.e., at approximately 20° C., are shown in Table 2, the amount of absorbed hydrogen being indicated as cubic centimeters per gram of alloy.

As indicated in Table 2, metallic material for hydrogen storage according to the invention principally includes titanium or zirconium, which are comparatively cheap and have large hydrogen storage capacity, and manganese, which is cheap and easily available.

Figure 1:
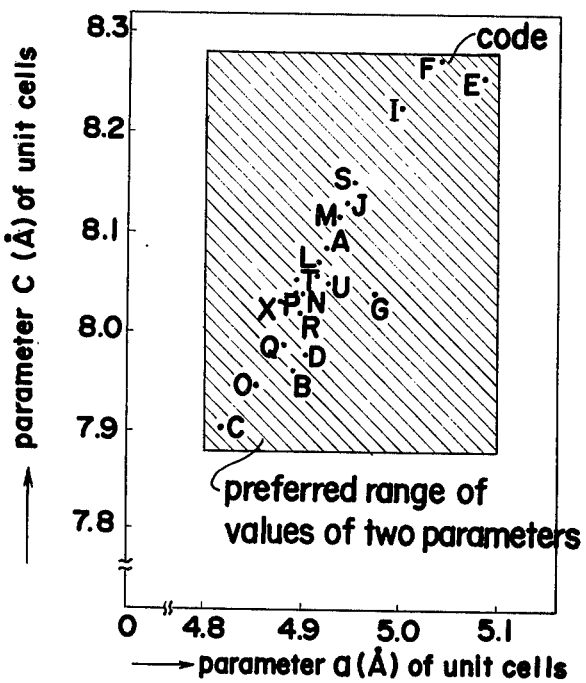

FIG. 1 is a graph of the values of the crystal lattice parameters a and c of alloys according to the invention which are listed in Table 2. In the drawing the letters A ~ W indicate the correspondingly identified alloys of Table 2, and the shaded portion indicates the range of materials presently claimed.

Table 2

| Code | Alloy Composition | a (Å) | c (Å) | Hydrogen absorption (cc/g) at room temp. (approx.) 20° C.) |
|------|------|------|------|------|
| A | $TiMn_{1.0}$ | 4.925 | 8.085 | 283 |
| B | $TiMn_{1.28}$ | 4.891 | 7.962 | 216 |
| C | $TiMn_{2.0}$ | 4.818 | 7.902 | 8.2 |
| D | $TiCr_{2.0}$ | 4.904 | 7.979 | 104 |
| E | $ZrCr_{2.0}$ | 5.084 | 8.255 | 236 |
| F | $ZrMn_{2.0}$ | 5.040 | 8.274 | 215 |
| G | $Ti_{0.7}Zr_{0.3}Cr_{2.0}$ | 4.973 | 8.038 | 202 |
| H | $TiMn_{0.8}Ce_{0.2}$ | 4.962 | 7.785 | 318 |
| I | $Ti_{0.2}Zr_{0.8}Mn_{2.0}$ | 5.001 | 8.226 | 222 |
| J | $Ti_{0.5}Zr_{0.5}Mn_{2.0}$ | 4.946 | 8.130 | 226 |
| K | $Ti_{0.7}Zr_{0.3}Mn_{2.0}$ | 4.878 | 8.032 | 122 |
| L | $Ti_{0.6}Zr_{0.4}Mn_{1.5}Cu_{0.5}$ | 4.917 | 8.072 | 178 |
| M | $Ti_{0.6}Zr_{0.4}Mn_{1.0}Cu_{1.0}$ | 4.938 | 8.118 | 118 |
| N | $Ti_{0.7}Zr_{0.3}Mn_{1.5}Cu_{0.5}$ | 4.901 | 8.040 | 163 |
| O | $Ti_{0.9}Zr_{0.1}Mn_{1.5}Cu_{0.5}$ | 4.855 | 7.945 | 33 |
| P | $Ti_{0.6}Zr_{0.4}Mn_{1.9}Cu_{0.1}$ | 4.895 | 8.041 | 207 |
| Q | $Ti_{0.7}Zr_{0.3}Mn_{1.7}Cu_{0.3}$ | 4.883 | 7.987 | 149 |
| R | $Ti_{0.6}Zr_{0.4}Mn_{1.5}Fe_{0.5}$ | 4.898 | 8.021 | 24 |
| S | $Ti_{0.8}Zr_{0.2}Mn_{1.5}Mo_{0.5}$ | 4.954 | 8.152 | 186 |
| T | $Ti_{0.8}Zr_{0.2}Mn_{1.8}Mo_{0.2}$ | 4.917 | 8.059 | 202 |
| U | $Ti_{0.8}Zr_{0.2}Mn_{1.7}Mo_{0.3}$ | 4.926 | 8.052 | 195 |

As seen in Table 2, when in an atmosphere of hydrogen under high pressure at room temperature, the hydrogen storage material of the invention absorbs large quantities of hydrogen. This absorption moreover is effected easily and in a short time, as shown by test results noted below, and the process is easily reversible to cause release of large amounts of hydrogen.

The invention is described in further detail below with reference to several specific examples thereof.

As a first Example of the hydrogen storage material of the invention there was prepared an alloy in which the base material was $TiMn_2$ and in which partial substitution of the titanium by zirconium was effected to give alloys having the general formula $Ti_{1-\alpha}Zr_\alpha Mn_{2.0}$, wherein $0<\alpha<1$.

A suitable method for the manufacture of such alloys is as follows. There is prepared a bar of 99% pure titanium, such as commercially available, having a diameter of approximately 8 mm and a length of approximately 10 mm, commercially available 99% pure sponge zirconium, and a plate of 99% pure electrolytic manganese about 1.5 mm thick and 10 mm square. Alloys having the desired formula $Ti_{1-\alpha}Zr_\alpha Mn_{2.0}$ are formed in a short time if these materials are melted together in an argon arc furnace. To form the hydride, in each case the alloy, is introduced into a pressure-resistant reaction vessel, from which gas is then evacuated. After this, if 99.99% pure hydrogen gas is introduced into the reaction vessel, the reaction vessel is sealed, and the pressure of hydrogen gas therein is brought to and held at approximately 10 atmospheres, absorption of hydrogen by the $Ti_{1-\alpha}Zr_\alpha Mn_{2.0}$ alloy proceeds rapidly at room temperature, and in a short time there is formed a hydride of the alloy, having for example the composition $Ti_{0.6}Zr_{0.4}Mn_{2.0}H_{2.5}$, constituting a metal hydride in which hydrogen is stored. If the pressure of hydrogen gas around the hydride thus formed in the reaction vessel is reduced or if the ambient temperature is increased, hydrogen is released from the alloy and is again available as gaseous hydrogen.

Table 3 shows values, obtained by X-ray diffraction analysis, of the crystal lattice parameters a and c in various alloys having a composition of the general formula $Ti_{1-\alpha}Zr_\alpha Mn_{2.0}$ and also shows results of measurements of the hydriding characteristics of these alloys indicating the amount of hydrogen absorbed at room temperature and the hydrogen release ratio, i.e., the proportion, expressed as a percentage, of the amount of hydrogen released to the atmosphere at room temperature to the amount of hydrogen absorbed by the alloy as a result of the hydriding process.

Figure 2:
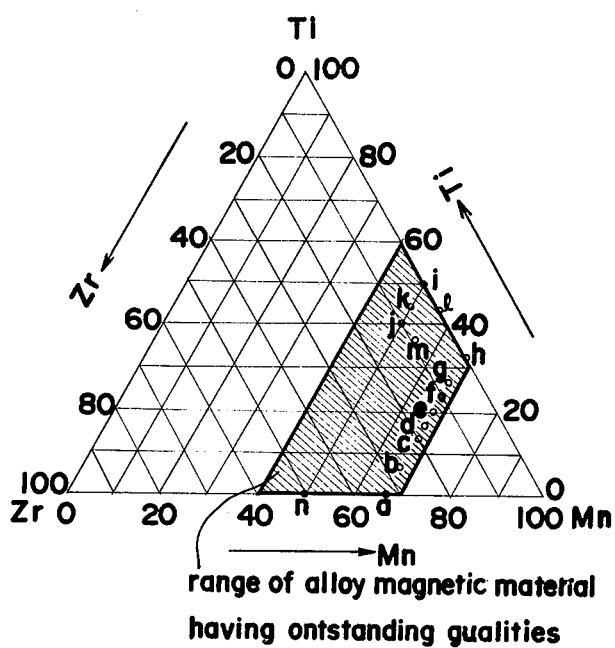
FIG. 2 is a ternary equilibrium diagram of the Ti — Zr — Mn alloy system in which the shaded portion indicates the range of alloys having outstanding qualities as hydrogen storage material.

The equilibrium diagram of an xTi — yZr — zMn alloy is shown in FIG. 2, in which the letters a — n indicate the correspondingly identified alloys of Table 3, and the shaded portion indicates the range of composition of compounds which offer particular advantages with respect to use thereof as hydrogen storage material.

From FIG. 2 it is seen that in this range the atomic percentage of titanium is $0 < x \leq 60$, that of zirconium is $0 < y \leq 60$, and that of manganese is $z = 40 \sim 70$, with $x + y = 30 \sim 60$ and $x + y + z = 100$.

Table 3

| Alloy Code. | Composition | Crystal Lattice Parameters a (Å) | a (Å) | Hydrogen Absorption (20° C.) No. of hydrogen atoms/ No. of alloy atoms | cc/g | Hydrogen Release Ratio (%) |
|---|---|---|---|---|---|---|
| a | $ZrMn_{2.0}$ | 5.040 | 8.274 | 1.2 | 215 | 6.7 |
| b | $Ti_{0.2}Zr_{0.8}Mn_2$ | 5.001 | 8.226 | 1.18 | 222 | 11.0 |
| c | $Ti_{0.4}Zr_{0.6}Mn_2$ | 4.967 | 8.174 | 1.15 | 225 | 7.6 |
| d | $Ti_{0.5}Zr_{0.5}Mn_2$ | 4.946 | 8.130 | 1.12 | 226 | 8.0 |
| e | $Ti_{0.6}Zr_{0.4}Mn_2$ | 4.903 | 8.040 | 0.82 | 169 | 13.4 |
| f | $Ti_{0.7}Zr_{0.3}Mn_2$ | 4.878 | 8.032 | 0.58 | 122 | 30.8 |
| g | $Ti_{0.8}Zr_{0.2}Mn_2$ | 4.861 | 7.952 | 0.03 | 7.2 | 35.0 |
| h | $TiMn_{2.0}$ | 4.818 | 7.902 | 0.04 | 8.2 | 33.0 |
| i | $TiMn_{1.0}$ | 4.915 | 8.030 | 1.2 | 283 | 39.0 |
| j | $Ti_{0.8}Zr_{0.2}Mn$ | 4.962 | 8.166 | 1.22 | 262 | 5.3 |
| k | $Ti_{0.9}Zr_{0.1}Mn$ | — | — | 1.26 | 283 | 6.3 |
| l | $TiMn_{1.28}$ | 4.888 | 8.009 | 0.91 | 216 | 56.0 |
| m | $Ti_{0.8}Zr_{0.2}Mn_{1.2}$ | — | — | 1.19 | 259 | 5.9 |
| n | $ZrMn_{1.0}$ | — | — | 1.47 | 240 | 3.8 |

As seen from Table 3, in an alloy having the composition xTi — yZr — zMn if either the proportion x of titanium in terms of atomic percentage or the proportion y of zirconium exceeds 60, or if the sum of x and y is lower than 30 or higher than 60, either the amount of hydrogen absorption becomes extremely small or the amount of hydrogen released at room temperature becomes extremely small. Also, if x or y is higher than 60 or x + y is outside the range 30–60, higher temperature (around 200° C. or more) and high pressure (of the order of 40 atmospheres or more) are necessary to effect absorption of hydrogen. On the other hand, if the atomic percentage of manganese is outside the range 40 ~ 70, hydrogenation at room temperature is difficult to effect. In addition, if the values of x, y, and z. are outside the ranges noted in reference to FIG. 2, it is difficult to obtain alloys of even quality and insure maintenance of good hydrogen storage characteristics. It was therefore concluded that for this particular type of alloy the values of x, y, and z should be kept within the above-noted ranges.

If such an alloy is represented by a formula indicating proportions of the different components in terms of atomic ratios, for example by the formula $Ti_\alpha Zr_\beta Mn_\gamma$, instead of by the formula xTi — yZr — zMn indicating atomic percentages, the corresponding ranges are $0 < \alpha \leq 1.5$, $0 < \beta \leq 1.5$, $\gamma = 0.66 \sim 2.4$, and $\alpha + \beta = 0.42 \sim 1.5$.

Figure 3:
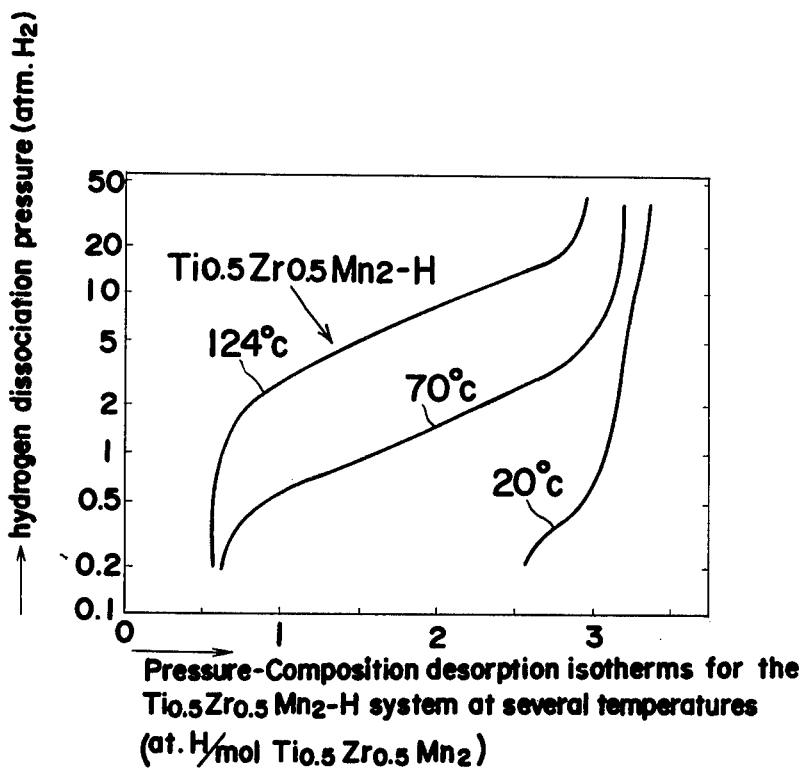
FIG. 3 is a graph which plots hydrogen dissociation pressure — composition isotherms for the $Ti_{0.5}Zr_{0.5}Mn_{2.0}$ — H system by way of example of hydriding characteristics of a Ti — Zr — Mn alloy according to the invention.

FIG. 3 plots hydrogen dissociation pressure — composition isotherms for the system $Ti_{0.5}Zr_{0.5}Mn_{2.0}$ — H. From the drawing it is seen that even for alloy phases for which the amount of released hydrogen is small (18 cc/g) at room temperature, the hydrogen release ratio can be increased considerably by raising ambient temperature to the moderately high value of 124° C.

Figure 4:
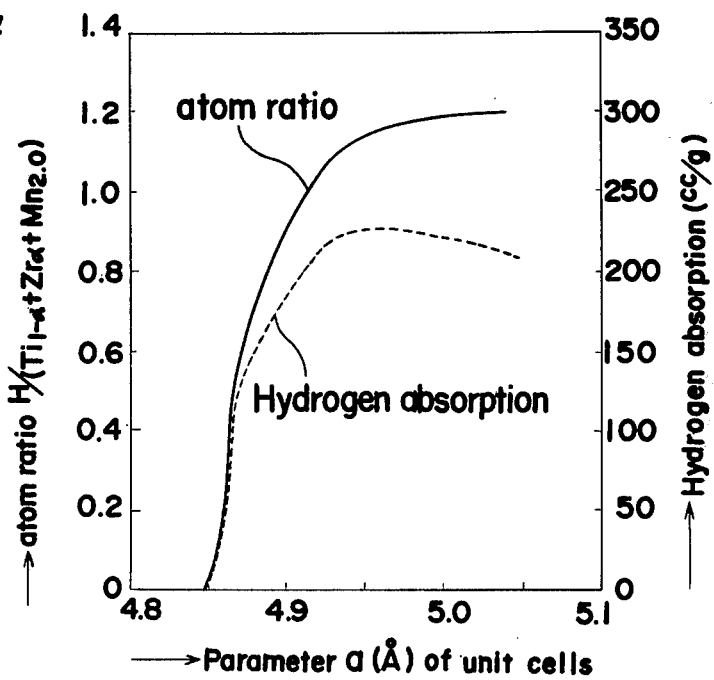
FIG. 4 is a graph which plots the amount of initial hydrogen absorption at room temperature by an alloy having the formula $Ti_{1-a}Zr_aMn_{2.0}$, having a crystal lattice of the MgZn$_2$ type, and existing in the Laves phase against the crystal lattice parameter a of the alloy.
Figure 5:
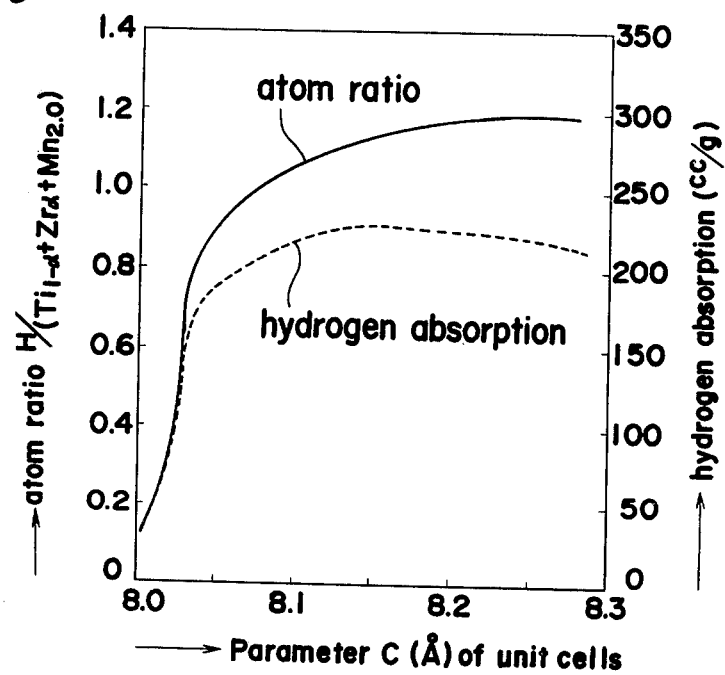
FIG. 5 is a graph similar to the graph of FIG. 4 which plots the amount of initial hydrogen absorption against the crystal lattice parameter c.

FIGS. 4 and 5 show the relation between the initial absorption of hydrogen at room temperature by an alloy having the general formula $Ti_{1-\alpha}Zr_\alpha Mn_{2.0}$ and the crystal lattice parameters a and c, respectively, when the alloy has an $MgZn_2$ crystal structure and exists as a Laves phase. From Table 3 and FIGS. 4 and 5 it is seen that the amount of hydrogen absorption at room temperature varies with varying values of the parameters a and c, and that for a $Ti_{1-\alpha}Zr_\alpha Mn_{2.0}$ alloy the most suitable values of the parameters if the alloys are to be employed as hydrogen storage material are in the approximate ranges:

$a = 4.84 \sim 4.96$ (Å)
$c = 7.95 \sim 8.16$ (Å).

Also it is seen that, as for absorption of hydrogen, release of hydrogen in conditions of normal temperature and pressure is dependent on the crystal lattice parameters a and c of $MgZn_2$ type crystals constituting a Laves phase.

From the above therefore it is ascertained that the above-described $Ti_{1-\alpha}Zr_\alpha Mn_{2.0}$ alloys have an $MgZn_2$ type (C14) crystal structure defining a Laves phase, and that those alloys of this type which have crystal lattice parameters in the above-noted ranges constitute first-rate hydrogen storage materials which can easily absorb and store large amounts of hydrogen at normal temperatures in the vicinity of 20° C.

According to a second embodiment of the invention, there is employed as a base alloy one having the formula $Ti_\alpha Mn_2$, $\alpha$ being in the range $1.0 \sim 1.5$, and substitution of a portion of the Ti component by zirconium and substitution of a portion of the Mn component by molybdenum are effected, to give an alloy having the general formula $Ti_{x-y}Zr_y Mn_{2-z}Mo_z$. Hydriding characteristics of this material are described below with reference to Table 4, which notes various examples of alloys having this composition together with the values of the Laves phase $MgZn_2$ crystal structure parameters thereof.

Table 4

| Alloy $Ti_{x-y}Zr_y Mn_{2-z}Mo_z$ | Hydriding temp. | Delay to initial hydrogenation (min.) | Hydrogen absorption (room temp.) at. h $Ti_{x-y}Zr_y Mn_{2-z}Mo_z$ | $H_2$ (cc) Alloy wt. (g) | Qty. released hydrogen (room temp.) Release ratio (%) | $H_2$ (cc) Alloy wt. (g) | Crystal lattice parameters a (Å) | c (Å) |
|---|---|---|---|---|---|---|---|---|
| $TiMn_2$ | 24 | 120 | 0.11 | 8.2 | 33 | 2.7 | 4.82 | 7.90 |
| $Ti_{0.9}Zr_{0.1}Mn_{1.9}Mo_{0.1}$ | 17 | 4.5 | 0.16 | 11 | — | — | 4.88 | 7.99 |
| $Ti_{0.9}Zr_{0.1}Mn_{1.8}Mo_{0.2}$ | 20 | 1.6 | 0.29 | 21 | — | — | 4.89 | 8.03 |
| $Ti_{0.9}Zr_{0.1}Mn_{1.7}Mo_{0.3}$ | 20 | 0.5 | 1.0 | 70 |  | 9.8 | 6.9 |  |
|  | 80 | 0 | 0.81 | 56 | 8.0 | 4.4 |  |  |
|  | 20 | 0.1 | 3.1 | 218 | 65 | 143 | 4.90 | 8.05 |
| $Ti_{0.8}Zr_{0.2}Mn_{1.9}Mo_{0.1}$ | 49 | 0 | 3.0 | 208 | 82 | 171 |  |  |
|  | ,0 | 0.4 | 3.0 | 209 | 67 | 141 |  |  |
| $Ti_{0.8}Zr_{0.2}Mn_{1.8}Mo_{0.2}$ | 20 | 0.3 | 2.9 | 202 | 73 | 147 | 4.92 | 8.06 |
|  | 65 | 0 | 2.6 | 180 | 84 | 152 |  |  |
|  | 20 | 0 | 2.9 | 195 | 86 | 167 |  |  |
| $Ti_{0.8}Zr_{0.2}Mn_{1.7}Mo_{0.3}$ |  |  |  |  |  |  | 4.93 | 8.05 |
|  | 56 | 0 | 2.1 | 143 | 85 | 121 |  |  |
|  | 17 | 0 | 2.6 | 167 | 37 | 62 |  |  |
| $Ti_{0.8}Zr_{0.2}Mn_{1.5}Mo_{0.5}$ |  |  |  |  |  |  | 4.93 | 8.10 |
|  | 84 | 0 | 2.0 | 128 | 40 | 51 |  |  |
|  | 20 | 0 | 2.8 | 162 | 7.5 | 12 |  |  |
| $Ti_{0.8}Zr_{0.2}Mn_{1.0}Mo_{1.0}$ |  |  |  |  |  |  | 4.99 | 8.23 |
|  | 84 | 0 | 2.5 | 146 | 15 | 22 |  |  |
|  | 17 | 0 | 3.2 | 216 | 37 | 79 |  |  |
| $Ti_{0.7}Zr_{0.3}Mn_{1.9}Mo_{0.1}$ |  |  |  |  |  |  | 4.96 | 7.91 |
|  | 50 | 0 | 3.1 | 210 | 88 | 184 |  |  |
|  | 17 | 0 | 3.3 | 217 | 47 | 103 |  |  |
| $Ti_{0.7}Zr_{0.3}Mn_{1.8}Mo_{0.2}$ |  |  |  |  |  |  | 4.94 | 8.14 |
|  | 50 | 0 | 3.2 | 211 | 83 | 176 |  |  |
|  | 17 | 0 | 3.3 | 212 | 33 | 69 |  |  |
| $Ti_{0.7}Zr_{0.3}Mn_{1.7}Mo_{0.3}$ |  |  |  |  |  |  | 4.96 | 8.14 |
| $ZrMn_{2.0}$ | 20 | 0 | 3.6 | 215 | 6.7 | 14 | 5.04 | 8.2 |

As seen from Table 4, requisite ranges of the crystal structure parameters a and c to give suitably good qualities to metallic hydrogen storage material are $a = 4.85 \sim 4.96$ (Å) and $c = 7.95 \sim 8.18$ (Å), and optimum hydriding characteristics, especially with respect to release of hydrogen, are achieved by a composition in which the atomic ratios x, y, and z are in the regions of x = 1.0, y = 0.2, and z = 0.3 at room temperature, and x = 1.0, y = 0.3, and z = 0.1 at about 50° C., while release ratios are 86% (167 cc/g) and 88% (184 cc/g) respectively.

Figure 6:
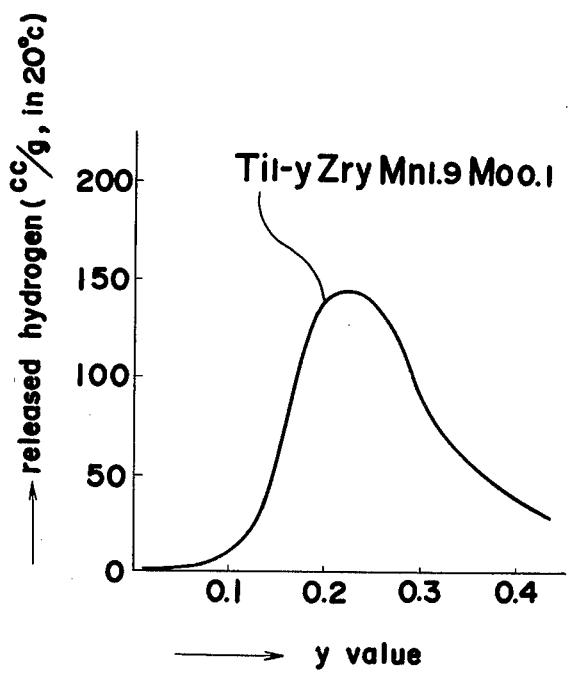
FIG. 6 is a graph which plots the relationship of the amount of released hydrogen (cc/g) at room temperature to the value of y in a compound having the general formula Ti$_{1-y}$Zr$_y$Mn$_{1.9}$Mo$_{0.1}$ by way of illustration of properties of another embodiment of the invention constituted by a Ti — Zr — Mn — Mo alloy.
Figure 7:
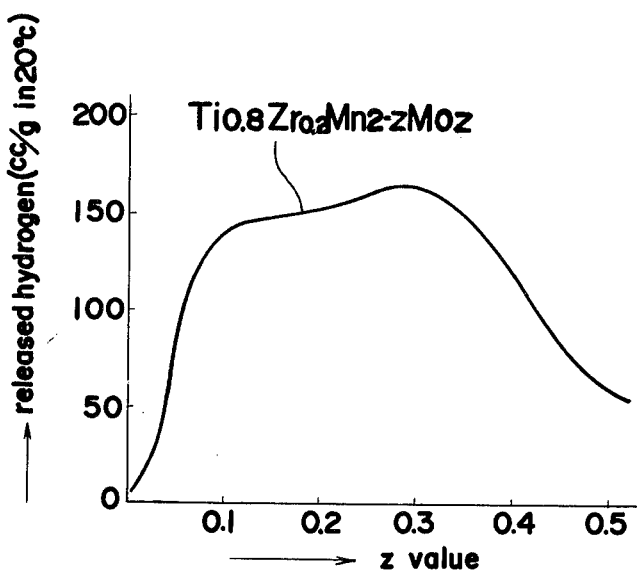
FIG. 7 is a similar drawing showing the relationship of the amount of released hydrogen (cc/g) at room temperature to the value of z in a compound having the general formula Ti$_{0.8}$Zr$_{0.2}$Mn$_{2-z}$Mo$_z$.

To illustrate qualities of examples of alloys of the formula $Ti_{x-y}Zr_yMn_{2-z}Mo_z$, the relation between release of hydrogen (cc/g) at room temperature and the value of y when x = 1.0 and z = 0.1 is shown in FIG. 6, and the relation between the amount of released hydrogen (cc/g) and the value of z when x = 1.0 and y = 0.2 is shown in FIG. 7.

Comparing Table 4 and FIGS. 6 and 7, it is seen that in the composition range in which a $Ti_{x-y}Zr_yMn_{2-z}Mo_z$ can effectively exist as a Laves phase having an $MgZn_2$ crystal structure optimum qualities for hydrogen storage material are achieved when the atomic ratios x, y, and z have the value or are in the ranges x = 1.0, y = 0.2 ~ 0.3, z = 0.1 ~ 0.4, and that with alloys having such a composition not only is absorption of large amounts of hydrogen possible but also more than 80% desorption hydrogen is easily achieved at a temperature of several tens of degrees centigrade.

Figure 8:
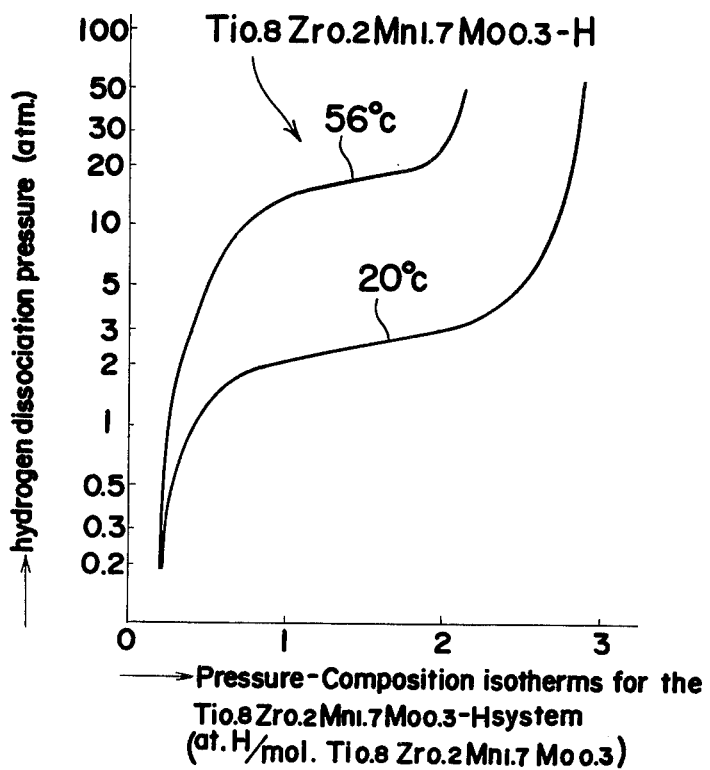
FIG. 8 is a graph which plots equilibrium pressure — composition isotherms for the system Ti$_{0.8}$Zr$_{0.2}$Mn$_{1.7}$Mo$_{0.3}$ — H by way of example of the hydriding characteristics of a Ti — Zr — Mn — Mo alloy according to the invention.
Figure 9:
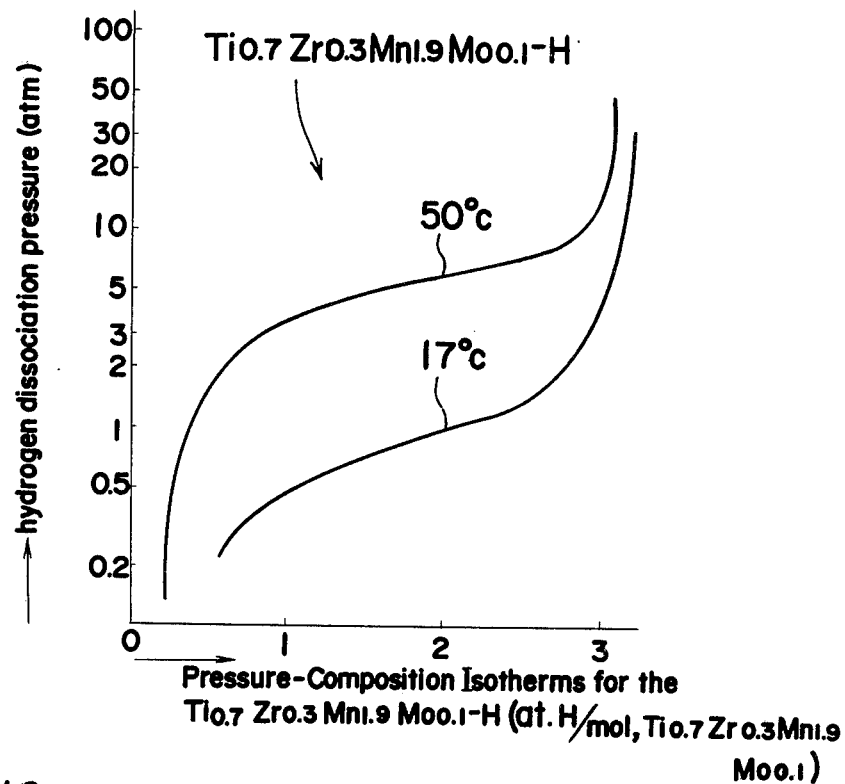
FIG. 9 is a similar drawing which plots equilibrium pressure — composition isotherms for the system Ti$_{1.7}$Zr$_{0.3}$Mn$_{1.9}$Mo$_{0.1}$ — H.

Hydrogen dissociation equilibrium — composition isotherms for the system $Ti_{0.8}Zr_{0.2}Mn_{1.7}Mo_{0.3}$ are shown in FIG. 8, and similar curves for the system $Ti_{0.7}Zr_{0.3}Mn_{1.9}Mo_{0.1}$ — H are shown in FIG. 9.

According to a third embodiment of the invention, there is similarly employed as base alloy $Ti_\alpha Mn_{2.0}$, $\alpha$ being in the range 1.0 ~ 1.5, and substitution of a portion of the Ti component by zirconium and of a portion of the Mn component by copper is effected to give an alloy having a composition represented by the general formula $Ti_{x-y}Zr_yMn_{2-z}Cu_z$.

The hydriding characteristics of various examples of such an alloy are indicated in Table 5 together with the corresponding a and c of the Laves phase $MgZn_2$ type crystal lattices defined thereby.

Table 5

| Alloy $Ti_{x-y}Zr_yMn_{2-z}Cu_z$ | hydrogenation temp. | Delay to initial hydrogenation (min.) | Hydrogen absorption (room temp.) at.H $Ti_{x-y}Zr_yMn_{2-z}Cu_z$ | H₂ (cc) alloy wt. (g) | Qty. release hydrogen (room temp.) Release ratio | H₂ (cc) Alloy wt. (g) | crystal lattice parameters a (Å) | c (Å) |
|---|---|---|---|---|---|---|---|---|
| $Ti_{0.9}Zr_{0.1}Mn_{1.5}Cu_{0.5}$ | 0 | 90 | 0.40 | 29 | — | — | | |
| | 20 | 90 | 0.46 | 33 | 17 | 5.7 | 4.85 | 7.94 |
| $Ti_{0.8}Zr_{0.2}Mn_{1.7}Cu_{0.3}$ | 0 | 15 | 0.29 | 21 | 55 | 11 | | |
| | 20 | 13 | 0.29 | 21 | 17 | 3.6 | 4.86 | 7.96 |
| $Ti_{0.8}Zr_{0.2}Mn_{1.5}Cu_{0.5}$ | 0 | 10 | 2.0 | 143 | 68 | 98 | | |
| | 20 | 8 | 2.0 | 139 | 86 | 120 | 4.89 | 8.03 |
| $Ti_{0.8}Zr_{0.2}Mn_{1.0}Cu_{1.0}$ | 0 | 30 | 1.5 | 102 | 77 | 78 | | |
| | 20 | 30 | 1.5 | 103 | 75 | 77 | 4.89 | 8.03 |
| $Ti_{0.7}Zr_{0.3}Mn_{1.9}Cu_{0.1}$ | 17 | 3 | 2.0 | 138 | 80 | 111 | 4.90 | 8.05 |
| | 0 | 3 | 2.2 | 153 | 22 | 33 | | |
| $Ti_{0.7}Zr_{0.3}Mn_{1.7}Cu_{0.3}$ | 20 | 3 | 2.1 | 149 | 41 | 61 | 4.88 | 7.99 |
| | 47 | 0 | 2.1 | 144 | 83 | 119 | | |
| | 20 | 1 | 2.4 | 163 | 44 | 72 | | |
| $Ti_{0.7}Zr_{0.3}Mn_{1.5}Cu_{0.5}$ | | | | | | | 4.90 | 8.04 |
| | 60 | 0 | 2.2 | 150 | 85 | 127 | | |
| | 20 | 1 | 3.0 | 207 | 18 | 36 | | |
| $Ti_{0.6}Zr_{0.4}Mn_{1.9}Cu_{0.1}$ | | | | | | | 4.89 | 8.04 |
| | 65 | 0 | 3.0 | 204 | 86 | 176 | | |
| $Ti_{0.6}Zr_{0.4}Mn_{1.7}Cu_{0.3}$ | 20 | 2 | 3.0 | 206 | 13 | 26 | 4.90 | 7.99 |
| | 68 | 0 | 2.9 | 195 | 85 | 166 | | |
| | 20 | 2 | 2.7 | 178 | 21 | 38 | | |
| $Ti_{0.6}Zr_{0.4}Mn_{1.5}Cu_{0.5}$ | | | | | | | — | — |
| | 59 | 1 | 2.4 | 162 | 69 | 111 | | |
| | 20 | 3 | 1.8 | 118 | 13 | 16 | | |
| $Ti_{0.6}Zr_{0.4}Mn_{1.0}Cu_{1.0}$ | | | | | | | — | — |
| | 86 | 1 | 1.7 | 109 | 56 | 61 | | |
| | 20 | 70 | 1.5 | 93 | 14 | 13 | | |
| $Ti_{0.6}Zr_{0.4}Mn_{0.5}Cu_{1.5}$ | | | | | | | — | — |
| | 65 | 30 | 1.4 | 87 | 19 | 17 | | |
| | 19 | 1 | 3.3 | 220 | 10 | 22 | | |
| $Ti_{0.5}Zr_{0.5}Mn_{1.95}Cu_{0.05}$ | 50 | 0 | 3.2 | 212 | 42 | 88 | 4.95 | 8.16 |
| | 95 | 0 | 3.0 | 203 | 80 | 161 | | |
| | 14 | 1 | 3.3 | 215 | 8.2 | 18 | | |
| $Ti_{0.5}Zr_{0.5}Mn_{1.9}Cu_{0.1}$ | | | | | | | 4.94 | 8.15 |
| | 95 | 0 | 3.2 | 206 | 79 | 163 | | |
| | 17 | 3 | 3.2 | 207 | 7.9 | 16 | | |
| $Ti_{0.5}Zr_{0.5}Mn_{1.7}Cu_{0.3}$ | 50 | 2 | 3.1 | 202 | 18 | 37 | 4.96 | 8.13 |
| | 92 | 1 | 3.0 | 195 | 80 | 155 | | |
| | 14 | 0 | 3.5 | 220 | 7.0 | 15 | | |
| $Ti_{0.4}Zr_{0.6}Mn_{1.9}Cu_{0.1}$ | | | | | | | — | — |
| | 97 | 0 | 3.1 | 196 | 61 | 119 | | |
| | 17 | 2 | 3.7 | 225 | 6.6 | 15 | | |
| $Ti_{0.2}Zr_{0.8}Mn_{1.9}Cu_{0.1}$ | | | | | | | 5.01 | 8.26 |
| | 97 | 1 | 3.5 | 215 | 10 | 22 | | |

From Table 5 it is seen that optimum qualities for hydrogen storage are achieved by an alloy of the above-noted formula when the crystal lattice parameters a and c are in the ranges a = 4.85 ~ 4.96 (Å) and c = 7.95 ~ 8.18 (Å). It is also seen that optimum hydriding characteristics, particularly with respect to the amount of released hydrogen, are achieved at room temperature when the atomic ratios x, y, and z are respectively in the region of 1.0, 0.2, and 0.5, which values result in a composition which achieves a hydrogen release ratio of 86% (120 cc/g), and in the vicinity of 65° C. when the atomic ratios are respectively about 1.0, 0.4, and 0.1, which values result in a composition which achieves a hydrogen release ratio of 86% (176 cc/g) at this latter temperature.

Figure 10:
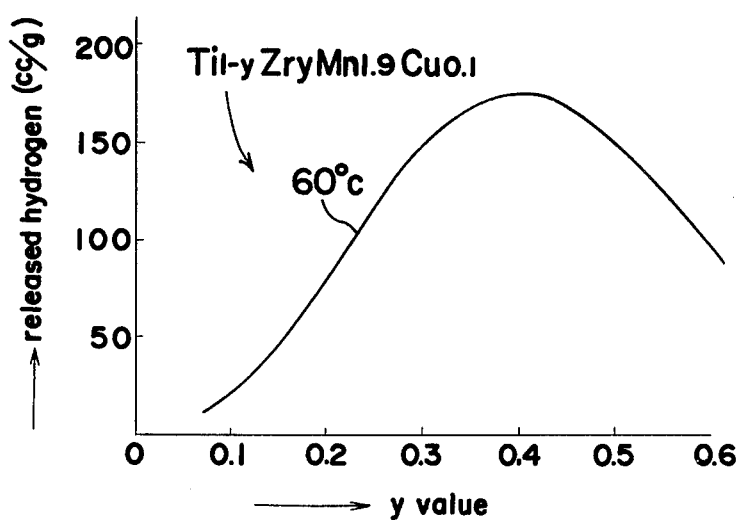
FIG. 10 is a graph showing the relation of the amount of released hydrogen (cc/g) at 60° C. to the value of y in an alloy having the general formula Ti$_{1-y}$Zr$_y$Mn$_{1.9}$Cu$_{0.1}$ by way of illustration of another embodiment of the invention constituted by a Ti — Zr — Mn — Cu alloy.

In illustration of properties of alloys having the general formula $Ti_{x-y}Zr_yMn_{2-z}Cu_z$, FIG. 10 plots the relation between the value of y in this formula and the amount of released hydrogen (cc/g) at 60° C. when x = 1.0 and z = 0.1, and FIG. 11 plots the relation between the value of z and the amount of released hydrogen (cc/g) when x = 1.0 and y = 0.3.

Comparison of Table 5 and FIGS. 10 and 11 shows that in the range in which a $Ti_{x-y}Zr_yMn_{2-z}Cu_z$ alloy can exist as a Laves phase $MgZn_2$ type alloy optimum qualities as hydrogen storage material are achieved when the atomic ratios x, y, and z are of the value or in the ranges x = 1.0, y = 0.2 ~ 0.6, and z = 0.05 ~ 0.5, and that by employment of alloys having such a composition, it is possible to achieve absorption of a large amount of hydrogen and more than 80% desorption of absorbed hydrogen even when ambient temperature is of the order of only several tens of degrees centigrade.

In further illustration of such an alloy hydrogen dissociation equilibrium — composition isotherms for the system $Ti_{0.6}Zr_{0.4}Mn_{1.9}Cu_{0.1}$ — H are plotted in FIG. 12.

To resume the above description of various embodiments of the invention, principal conditions for achievement of good characteristics as a hydrogen storage material by an alloy having an $MgZn_2$ crystal structure and existing as a Laves phase are that the crystal lattices be within the ranges specified in a portion of the claims of the invention, that the alloy phase be uniform and that the alloy components crystallize well, and also that the component elements of the alloy be such that the heat of formation of a hydride by the alloy is of the order of several Kcal/mol H and is comparable to the heat of dissolution of hydrogen from the hydride.

From the above it is concluded that apart from the specific non-limiting examples of the invention described above, the same excellent results may be achieved by suitable combinations of other $MgZn_2$ type Laves phase alloys constituted by elements of Group IVa or Groups VIa ~ VIII of the periodic table, for example $ZrMn_2$, $NbMn_2$, $TiFe_2$, $ZrV_2$ or $ZrCr_2$.

Although the present invention has fully been described in conjunction with the preferred embodiments thereof with reference to the accompanying drawings, it is to be noted that various changes and modifications are apparent to those skilled in the art.

Accordingly, such changes and modifications are to be understood as included within the true scope of the present invention unless they depart therefrom.

What is claimed is:

1. A Ti-Zr-Mn ternary alloy which is substantially a Laves phase intermetallic compound having a hexagonal $MgZn_2$ (C14) type crystal structure with crystal structure parameters a and c which have values in the range:

a = 4.80 ~ 5.10 Å, c = 7.88 ~ 8.28 Å.

2. An alloy according to claim 1 having the formula xTi — yZr — zMn, in which x, y and z are values indicating atomic percentages, 0 21 x ≦ 60, 0 < y ≦ 60, z = 40 ~ 70, x + y = 30 ~ 60, and x + y + z = 100.

3. An alloy according to claim 2 wherein said value of atomic percentage z is approximately equal to 66.7.

4. An alloy as claimed in claim 1 wherein said crystal lattice parameters a and c are in the range:

a = 4.84 ~ 4.96 Å c = 7.95 ~ 8.16 Å.

5. A Ti-Zr-Mn-Mo quaternary alloy which is substantially a Laves phase intermetallic compound having a hexagonal $MgZn_2$ (C14) type crystal structure with crystal structure parameters a and c which have values in the range:

a = 4.80 ~ 5.10 Å, c = 7.88 ~ 8.28 Å.

6. An alloy according to claim 5 having the formula $Ti_{x-y}Zr_yMn_{2-z}Mo_z$, in which x, y, and z are values indicating atomic ratios, x = 1.0 ~ 1.5, 0 — y ≦ 1.0, and 0 < z ≦ 1.0.

7. An alloy according to claim 6, wherein said atomic ratio value x is equal to 1.0.

8. An alloy according to claim 6, wherein said atomic ratio values x, y, and z are substantially x = 1.0, y = 0.2 ~ 0.3, and z = 0.1 ~ 0.4.

9. An alloy according to claim 8, wherein said atomic ratio values y and z substantially have the values 0.3 and 0.1, respectively.

10. An alloy according to claim 8, wherein said atomic ratio values y and z substantially have the values 0.2 and 0.3, respectively.

11. An alloy according to claim 5, wherein said crystal lattice parameters a and c are in the range:

a = 4.85 ~ 4.96 Å c = 7.95 ~ 8.18 Å.

12. A Ti-Zr-Mn-Cu quaternary alloy which is substantially a Laves phase intermetallic compound having a hexagonal $MgZn_2$ (C14) type crystal structure with crystal structure parameters a and c which have values in the range:

a = 4.80 ~ 5.10 Å, c = 7.88 ~ 8.28 Å.

13. An alloy according to claim 12 having the formula $Ti_{x-y}Zr_yMn_{2-z}Cu_z$, in which x, y, and z are values indicating atomic ratios, x = 1.0 ~ 1.5, 0 < y ≦ 1.0, and 0 < z ≦ 1.5.

14. An alloy according to claim 13 wherein said atomic ratio value x substantially has the value 1.0.

15. An alloy according to claim 13 wherein said atomic ratio values are substantially x = 1.0, y = 0.2 ~ 0.6, and z = 0.05 ~ 0.5.

16. An alloy according to claim 15 wherein said atomic ratio values y and z are substantially equal to 0.2 and 0.5, respectively.

17. An alloy according to claim 15 wherein said atomic ratio values y and z are substantially equal to 0.4 and 0.1, respectively.

18. An alloy according to claim 12 wherein said crystal lattic parameters a and c are in the range:

a = 4.85 ~ 4.96 Å c = 7.95 ~ 8.18 Å.

* * * * *